United States Patent [19]

Cochrane

[11] Patent Number: 4,506,458
[45] Date of Patent: Mar. 26, 1985

[54] CONTROL CIRCUIT FOR GAS HEATED APPLIANCE

[75] Inventor: Michael W. Cochrane, Lexington, Ohio

[73] Assignee: White Consolidated Industries, Inc., Cleveland, Ohio

[21] Appl. No.: 600,126

[22] Filed: Apr. 13, 1984

[51] Int. Cl.³ ............................................. F26B 19/00
[52] U.S. Cl. ............................................ 34/48; 34/53
[58] Field of Search ................... 236/46 R; 34/53, 48

[56] References Cited

U.S. PATENT DOCUMENTS

| | | | |
|---|---|---|---|
| 3,612,500 | 10/1971 | Cramer | 34/48 X |
| 4,112,588 | 9/1978 | Marcade | 34/48 X |
| 4,418,271 | 11/1983 | Smoch | 34/48 X |

Primary Examiner—William E. Wayner
Attorney, Agent, or Firm—Pearne, Gordon, Sessions, McCoy, Granger & Tilberry

[57] ABSTRACT

A normally closed, single pole, single throw, thermostatic switch is electrically connected in parallel relationship across a timer motor. The parallel network constituted by the timer motor and switch is connected in series relationship with a gas burner regulation circuit. The series-parallel network, constituted by the interconnected timer motor, thermostatic switch, and burner circuit, is electrically connected between two main power lines via timer motor controlled contacts. The impedance of the timer motor is substantially greater than the impedance of the burner circuit. Thus, when the thermostatic switch opens, the timer motor runs while the series-controlled lower impedance burner control circuit, and its associated gas burner, do not operate. Under predetermined decreasing temperature conditions, the thermostatic switch will reclose to deenergize the timer motor and energize the burner control circuit. Such a simplified control circuit provides for both time and temperature dependent regulation of the associated gas burner, such as is used in a gas heated automatic clothes dryer of the domestic type.

3 Claims, 1 Drawing Figure

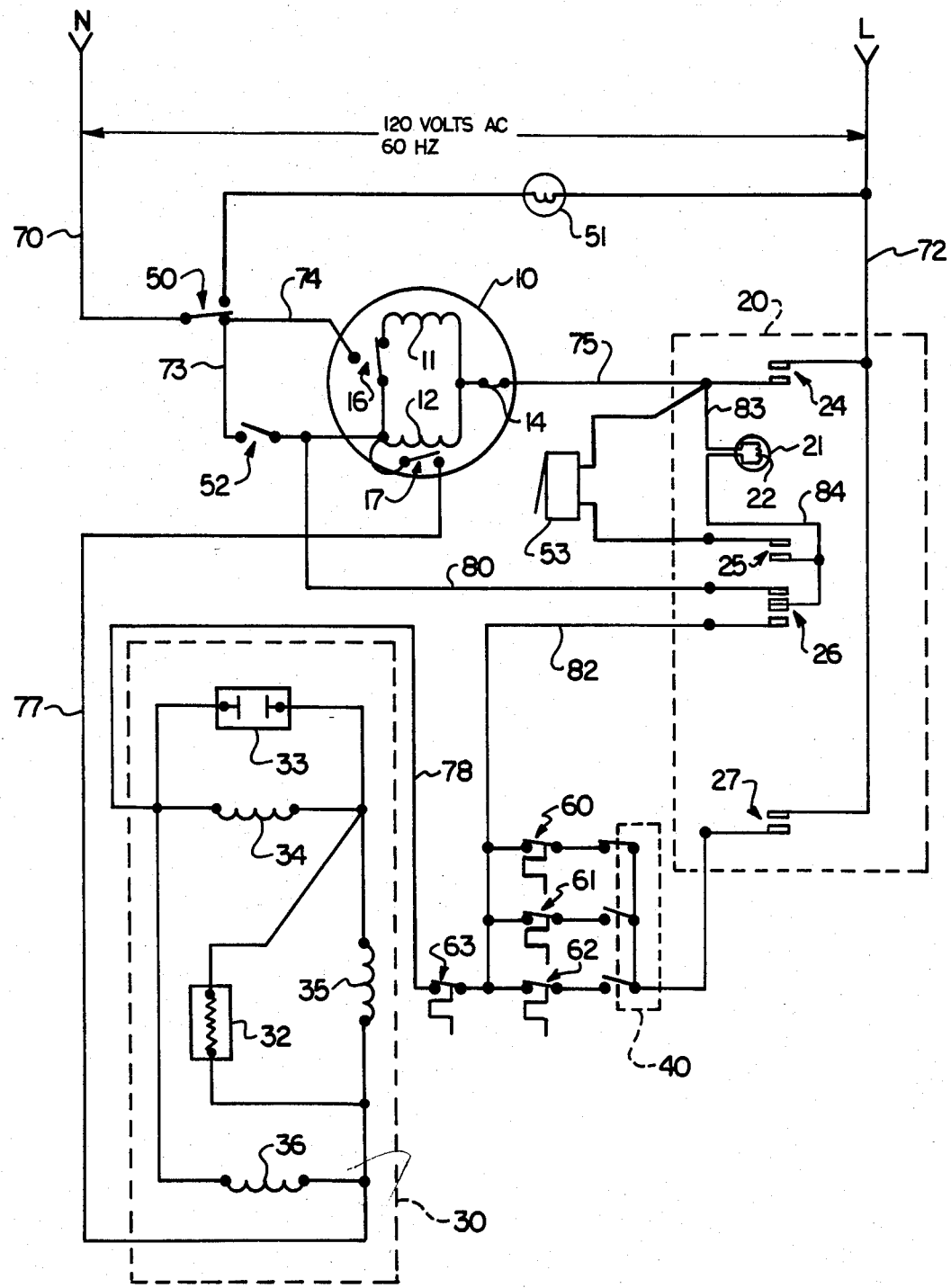

CONTROL CIRCUIT FOR GAS HEATED APPLIANCE

BACKGROUND OF THE INVENTION

The present invention relates in general to control circuits for appliances of the domestic type, and more particularly to a control circuit for a gas heated appliance such as a gas heated clothes dryer.

The domestic appliance industry is extremely competitive. As a result, manufacturers are continuously striving to lower the cost of domestic appliance products while providing long term reliability and product versitility.

For example, a gas heated clothes dryer should provide a plurality of drying temperatures for the clothes being air dried in the rotating, horizontally oriented, drum or tumbler that is a typical component of conventional domestic dryers. The provision of multiple temperatures for the air drying of clothes in the dryer usually requires the provision of a corresponding multiple of thermostatically operated switches for turning the associated gas burner on and off for predetermined time periods to heat the drying air to the required temperatures. Thus, one thermostatic switch would regulate the gas burner to provide high temperature drying, while second and third thermostatic switches would respectively regulate the gas burner to provide medium and low temperature drying. A user operated, multiposition switch allows the selection of high, medium, or low heat drying prior to the initiation of a drying cycle.

In addition to the provision of multiple drying temperatures, a domestic dryer of the gas heated type usually includes a timer mechanism for determining the length of a drying cycle. Such a timer mechanism, in combination with a selected one of the drying temperature regulating thermostatic switches, and a burner ignition and regulating circuit operating the associated gas burner generating the heated drying air, can provide automatic turn-off of the dryer after a predetermined fixed time period which has been preset by the user. A fully automatic drying cycle can also be provided wherein the drying time is automatically varied as a function of moisture level of the clothes being dried. As is well known in the art, the rate of the temperature rise of the drying air exhausted from the dryer is a function of the moisture in the clothes being dried. By monitoring the exhaust temperature of the dryer, a timer mechanism can be intermittently turned on and off for predetermined time periods, as a function of the monitored exhaust temperature, until the timer mechanism, functioning as an integrator, "times out" to terminate the drying cycle when the clothes are fully dried or nearly fully dried.

It is a purpose of the present invention to provide a simplified, low cost, gas heated appliance control circuit which, for example, could regulate a gas heated clothes dryer as noted above.

SUMMARY OF THE INVENTION

A gas heated appliance control circuit in accordance with the present invention includes an electrically operated timer having a relatively high impedance. A thermostatic switch, electrically connected in parallel relationship across the timer, comprises, with the timer, a parallel network. The parallel network is connected in series with a burner ignition and regulation circuit having an impedance substantially less than the impedance of the timer. The interconnected timer, switch, and burner circuit constitute a series-parallel network that is connected between a pair of voltage applying power lines. The lower impedance burner circuit operates only when the thermostatic switch is closed wherein the voltage across the power lines is substantially fully applied to the lower impedance burner circuit. The burner circuit becomes inoperative, and the higher impedance timer becomes operative, when the thermostatic switch paralleling the timer is opened wherein a major portion of the voltage across the power lines is applied to the higher impedance timer. A plurality of timer controlled contacts, via which the series-parallel network is connected between the power lines, establish an open condition to terminate intermittent operation of the burner circuit after the timer has operated for a predetermined period of accumulated time. Thus, both time and temperature regulation of a gas burner associated with burner circuit, is readily provided.

In a gas heated automatic clothes dryer, the control circuit in accordance with the invention can provide a fully automatic drying cycle. Preferably, the timer includes a timer motor having a high impedance motor winding. The thermostatic switch, used to monitor the temperature of the exhausted clothes drying air, can be a low cost, single pole, single throw, bimetal snap disc switch well known in the art. Multiple drying temperatures are easily provided by a plurality of such snap disc switches, a selected one of which is connected in parallel with the timer motor winding by a user operated multiposition switch to provide a predetermined clothes drying temperature.

The control circuit for a gas heated appliance, as discussed above, has proven to be highly versatile and reliable as applied in particular to the control of an automatic gas heated clothes dryer.

BRIEF DESCRIPTION OF THE DRAWING

A fuller understanding of the invention may be had by referring to the following description and claims taken in conjunction with the accompanying drawing wherein a schematic diagram of an embodiment of the control circuit in accordance with the present invention is illustrated.

DETAILED DESCRIPTION OF THE PREFERRED EMBODIMENT

As noted above, the present invention is directed to a novel control circuit for a gas heated appliance such as for example a gas heated automatic clothes dryer of the domestic type. Such a clothes dryer includes a drum or tumbler oriented for rotation on a horizontal axis, heated air provided by a gas burner being circulated through the rotating drum and exhausted therefrom by means of a blower assembly of the conventional type. The blower assembly and rotatable drum are usually driven by a single AC motor of the induction type. Such clothes dryers are well known in the art as are the major components of the overall dryer control circuit illustrated in the drawing.

With reference to the drawing, a clothes dryer of the type under consideration includes a single phase alternating current induction motor 10, the motor 10 driving and rotating the heretofore discussed drum or tumbler (not illustrated) containing the clothes to be dried, the motor 10 also driving a blower means (not illustrated) of a conventional type such as a centrifugal, squirrel cage blower. The motor 10 is of a conventional type and includes a start winding 11, a run winding 12, a normally closed thermal cut out safety switch 14, a first centrifugal switch 16 for controlling the motor 10 and a second centrifugal switch 17 for enabling the operation of the gas burner (not illustrated) providing heated air to the interior of the rotating drum or tumbler of the dryer.

The overall control circuit of the dryer further includes an electrically operated timer means 20 in the preferred form of a timer motor 21 having a timer motor winding 22 of relatively high electrical impedance. Operation of the timer motor 21 in association with switch actuating cam members (not illustrated) regulates the opening and closing of the plurality of contacts. The plurality of contacts include motor control contacts 24, audible signal controlling contacts 25, dryer mode controlling contacts 26, and drying temperature selector switch associated contacts 27. The electrically operated timer means 20 including the timer motor 21 and the contacts 24, 25, 26, 27 operate in a conventional manner well known in the art.

The gas heated automatic clothes dryer control circuit illustrated in the drawing further includes a gas burner regulation circuit 30 having a relatively low impedance as compared to the higher impedance timer motor winding 22. The gas burner regulation circuit 30 is conventional and provides failsafe operation of the conventional gas burner (not shown) providing the heated clothes drying air, the burner regulation circuit 30 including an ignitor coil 32, a flame sensing switch 33, a secondary coil 34, a booster coil 35 and a holding coil 36. Under normal operating conditions, the associated gas burner is ignited or extinguished when power is respectively applied to or removed from the regulation circuit 30.

Thus, the control circuit illustrated in the drawing includes three major conventional components namely the motor 10 for rotatably driving the drum or tumbler and blower means of the dryer, the burner regulation circuit 30 for operating an associated gas burner for providing heated air to the tumbler or drum of the dryer, and the electrically operated timer means 20 for controlling the energization of the induction motor 10 and the gas burner regulation circuit 30 as will be subsequently explained in greater detail.

Temperature regulation of the heated air supplied to tumbler or drum of the associated dryer is provided by a plurality of thermostatically operated switches, namely a low temperature thermostatic switch 60, a medium temperature thermostatic switch 61 and a high temperature thermostatic 62 all of the switches 60, 61, 62 being of the normally closed single pole single throw type. Electrically connected with the switches 60, 61, 62 is a normally closed high temperature safety thermostatic switch 63 of the single pole, single throw type, and a user operated multiposition selector switch 40. The thermostatic switches 60, 61, 62, 63 are preferably bimetal snap disc type switches well known in the art, the switches being located at a position wherein they can sense the exhausted drying air from the tumbler or drum.

The control circuit illustrated in the drawing also includes a dryer door actuated switch 50, a tumbler light 51, a user operated start switch 52 and an audible signal means or buzzer 53. The operation of these conventional components will be further discussed subsequently.

Powering of the control circuit illustrated in the drawing is provided by a first voltage applying power line or neutral line 70 and a second voltage applying power line or hot line 72. For example, the voltage across lines 70, 72 can be in the form of conventional 120 volts AC at 60 hertz.

The first voltage applying power line 70 is connected to the common pole of the door switch 50 which is of the single pole, double throw type. The switch 50 is held in the position illustrated in the drawing by an associated dryer door when it is in a closed condition. When the dryer door is open, the switch 50 will move to its other position to apply voltage to the conventional tumbler light 51 (not connected between lines 70, 72) which illuminates the interior of the drum or tumbler containing the clothes to be dried.

With the dryer door closed, the first voltage applying power line 70 is connected to a run power line 74 as illustrated. The power line 70 is also connected to a start power line 73 which is connected to the start switch 52 which is of the single pole, single throw, normally open push button type. The centrifugal switches 16, 17 are in the starting position illustrated in the drawing when the induction motor 10 is not rotating at a speed that will move the switches 16, 17 to their other positions opposite to that illustrated. As is well known in the art, when the user depresses an associated push button (not illustrated) to temporarily close normally open switch 52, power will be simultaneously applied via line 73 to the windings 11, 12 which are connected via thermal cutout switch 14 to the second voltage applying power line 72 via the pair of motor control contacts 24 (assumed closed) controlled by the timer motor 22. When the motor 10 reaches a predetermined rotational speed, switch 16 will disconnect the start winding 11 from line 73 and connect the run winding 12 to the run power line 74 to maintain operation of the motor 10 when switch 52 returns to its normally open condition after the user stops depressing the push button associated with switch 52. With the motor 10 running, switch 17 will close to connect the first voltage power applying line 70 to the first burner circuit power line 77 so as to enable operation of the burner regulation circuit 30. It can be seen that the centrifugal switch 17 functions in the conventional manner to ensure that the burner regulation circuit 30 cannot be energized unless the motor 10 is operating. The second burner circuit power line 78 is connected to the second voltage applying power line 72 via the selector switch associated contact 27 (assumed closed), one of the switches 60, 61, 62, (dependent upon the position of the selector switch 40), and the high temperature safety thermostatic switch 63 connected in series with line 78. Thus, it can be seen that the motor control contacts 24 and the selector switch associated contacts 27 provide power for the energization of the motor 10 and burner regulation circuit 30.

With reference to the dryer mode controlling contacts 26, such contacts are in the form of a single pole double throw switch, with the common pole of such switch being connected to a first timer motor interconnect line 84. A second timer motor interconnect line 83 being connected to the other end of the timer motor winding 22 and to line 75. When the contacts 26 are manually preset by the user to a time dry mode, line 84 is connected to a time dry power line 80 (connected to line 73 via switch 52) wherein the timer motor 21 (now connected between lines 70, 72) will operate continuously for a predetermined time until it "times out" to open the contacts 24, 27 and terminate operation of the dryer, i.e. motor 10 and burner regulation circuit 30 which had been cycling on and off under control of the selected one of the thermostatic switches 60, 61, 62. When the contacts 26 are in an auto dry mode, line 84 is connected to one end of an auto dry line 82 having its other end connected to the junction of switch 63 and switches 60, 61, 62. It is when the contacts 26 are in the auto dry mode, i.e. when line 84 is connected to line 82, that the circuit illustrated in the drawing operates in accordance with the present invention as will be subsequently discussed. The conventional buzzer 53 is, at the end or near the end of a drying cycle, connected in parallel with the timer motor winding 22 via the contacts 25 which cause the buzzer 53 to operate to audibly signal the user of the termination or the impending termination of the drying cycle as determined by the timing out of the timer 30.

The operation of the circuit in accordance with the present invention will now be discussed. In establishing an auto dry mode of operation of the dryer, contacts 24 and 27 are in a closed condition and contacts 26 are in an auto dry mode position to connect line 84 to line 82. The user of the dryer selects a desired drying temperature by moving the multiposition switch 40 to connect only a selected one of the three thermostatic switches 60, 61, 62 in circuit. As noted earlier, each of the switches 60, 61, 62 are positioned to sense the exhaust temperature of the drying air exiting the tumbler or drum of the dryer. As is well known in the art, the wetness of the clothes being dried determines the temperature of the exhaust air to which the thermostatic switches 60, 61, 62 are exposed. For example, assuming that the low temperature thermostatic switch 60 is connected in series with the contacts 27 and the high temperature thermostatic safety switch 63, when the switch 60 is in the closed condition, it is effectively connected is parallel across the timer motor winding 22 to preclude the timer motor from operating (i.e. motor winding 22 is shorted out). Under this condition, full line voltage i.e. the voltage across line 70, 72 is applied to the burner regulation circuit 30 via lines 77 and 78 wherein the associated gas burner is ignited and operated to provide heat for drying. When the exhaust temperature reaches a predetermined temperature, thermostatic switch 60 will open wherein the timer motor winding 22 and the burner regulating circuit 30 are in voltage dividing series relationship with each other and are connected across the power lines 70, 72. As will be recognized by those skilled in the art, the major portion of the voltage across lines, 70, 72 will be dropped across the higher impedance motor winding 22 wherein the motor will operate while the lower impedance burner regulation circuit 30 will be inoperative due to the small amount of voltage being applied to it. It can be seen that the interrelated operation of the timer motor 21 and the burner regulation circuit 30 is dependent on the open or closed condition of the thermostatic switch 60, or in the case of selecting a medium or high temperature drying is dependent upon the opening and closing of thermostatic switches 61 or 62.

Thus, the electrically operated timer means 20 constituted by the timer motor 21 having its winding 22 is electrically connected in parallel relationship with one of the thermostatic switches 60, 61 or 62 (depending upon the position of the user operator selector switch 40). The gas burner regulation circuit in turn is electrically connected in series relationship with the parallel network constituted by the interconnected timer motor winding 22 and one of the thermostatic switches 60, 61, 62. The interconnected timer motor winding 22, one of the the thermostatic switches 60, 61, 62, and the burner regulation circuit 30, interconnected as described, constitute a series-parallel network that is connected across the power line 70, 72 via a portion of the timer contacts, namely contacts 24, 26 and 27. In such a configuration, the lower impedance burner circuit operates only when the thermostatic switch (60, 61 or 62) is closed since substantially all of the voltage across line 70, 72 is applied to the timer motor winding 22. The timer motor 21 will operate intermittently as an integrator until it "times out" by opening contacts 24, 27 to terminate the auto mode drying cycle after a predetermined accumulated period of time.

Such a gas heated appliance control circuit has been found to be very cost effective such a circuit configuration permits the use of low cost single pole single throw thermostatic switches 60, 61, 62 as opposed to more expensive single pole double throw thermostatic switches that have been utilized in prior art control circuits. Also, single pole, single throw switches 60, 61 and 62 are more reliable due to their simpler construction.

Although the preferred embodiment of this invention has been shown and described, it should be understood that various modifications and rearrangements of the parts may be resorted to without departing from the scope of the invention as disclosed and claimed herein.

What is claimed is:

1. A control circuit for a gas heated appliance comprising:
   an electrically operated timer means including a timer motor having a relatively high impedance motor winding and a plurality of contacts whose open and closed condition is dependent on the operation of the timer motor;
   a single pole, single throw, thermostatic switch electrically connected in parallel relation across the timer motor winding, the interconnected winding and switch constituting a parallel network;
   a gas burner regulation circuit electrically connected in series relationship with said parallel network, said burner regulation circuit having an impedance substantially less than the impedance of the timer motor winding, said interconnected winding, switch, and burner circuit constituting a series-parallel network and;
   a pair of voltage applying power lines across which said series-parallel network is electrically connected via at least a portion of said plurality of contacts, wherein said lower impedance burner circuit operates only when said thermostatic switch is closed, voltage across said power lines being substantially fully applied to said burner circuit, said burner circuit being inoperative and said timer motor being operative when said thermostatic switch is open wherein a major portion of voltage across said power lines is applied to said higher impedance motor winding, said series-parallel network being electrically disconnected from at least one of said power lines when said portion of said plurality of contacts is opened by operation of said timer motor for a predetermined accumulated period of time, said thermostatic switch being one of a plurality of single pole, single thrown, thermostatic switches, each operable at a different temperature condition, said control circuit including a user operated selector switch for electrically connecting only a selected one of said thermostatic switches in parallel relationship with said motor winding at any given time.

2. A control circuit according to claim 1 including a normally closed, high temperature actuated, single pole, single throw thermostatic safety switch electrically connected in series relationship with said burner circuit.

3. A control circuit according to claim 2 wherein said high temperature thermostatic switch is electrically connected in series relationship between said burner circuit and said parallel network constituted by the interconnected timer motor and thermostatic switch, said high temperature thermostatic switch establishing an open condition at a predetermined high temperature condition wherein the application of voltage to said burner circuit by said power lines is precluded.

* * * * *